(12) United States Patent
Cao

(10) Patent No.: US 9,952,468 B2
(45) Date of Patent: Apr. 24, 2018

(54) DISPLAY PANEL AND METHOD FOR MANUFACTURING THE SAME

(71) Applicants: Shanghai Tianma Micro-Electronics Co., Ltd., Shanghai (CN); Tianma Micro-Electronics Co., Ltd., Shenzhen (CN)

(72) Inventor: Zhaokeng Cao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 127 days.

(21) Appl. No.: 14/736,142

(22) Filed: Jun. 10, 2015

(65) Prior Publication Data
US 2016/0077385 A1    Mar. 17, 2016

(30) Foreign Application Priority Data
Sep. 15, 2014 (CN) .......................... 2014 1 0468154

(51) Int. Cl.
*G02F 1/1337* (2006.01)
*G02F 1/1335* (2006.01)
(Continued)

(52) U.S. Cl.
CPC .. *G02F 1/133753* (2013.01); *G02F 1/133512* (2013.01); *G02F 1/13378* (2013.01);
(Continued)

(58) Field of Classification Search
CPC ......... G02F 1/133753; G02F 1/133512; G02F 1/13454; G02F 2001/133388;
(Continued)

(56) References Cited

U.S. PATENT DOCUMENTS 5,877,836 A * 3/1999 Miura ............... G02F 1/133753
349/129
2003/0112393 A1* 6/2003 Watanabe ......... G02F 1/133753
349/123

(Continued)

FOREIGN PATENT DOCUMENTS

JP           11-212095 A        8/1999

*Primary Examiner* — Edward Glick
*Assistant Examiner* — Shan Liu
(74) *Attorney, Agent, or Firm* — Alston & Bird LLP

(57) ABSTRACT

One inventive aspect is a liquid crystal display panel. The panel includes an array substrate and an opposite substrate. Each of the array substrate and the opposite substrate include a display area and a non-display area. The panel also includes a liquid crystal layer sandwiched between the array substrate and the opposite substrate, a first alignment layer disposed on a surface of the array substrate facing the liquid crystal layer, and a second alignment layer disposed on a surface of the opposite substrate facing the liquid crystal layer. The first and second alignment layers define a first orientation direction in the display area, and the non-display area includes at least one electrode line. The first and second alignment layers also define a second orientation direction at least in the non-display area corresponding to the electrode line.

14 Claims, 9 Drawing Sheets

(51) Int. Cl.
 *G02F 1/1333* (2006.01)
 *G02F 1/1345* (2006.01)
(52) U.S. Cl.
 CPC .... *G02F 1/13454* (2013.01); *G02F 1/133788* (2013.01); *G02F 2001/133388* (2013.01); *G02F 2001/133757* (2013.01); *G02F 2202/28* (2013.01)
(58) Field of Classification Search
 CPC ........... G02F 2202/28; G02F 1/133788; G02F 1/13378; G02F 2001/133757; G02F 1/1337; G02F 1/3775; G02F 1/133719; G02F 1/0027; G02F 1/141; G02F 2001/133776; G02F 2001/13787; G02F 2001/133773; G02F 2001/3548; G02F 2001/133742; G02F 2001/133769; G02F 2001/133738; G02F 2001/133746; G02F 2001/133749; G02F 1/13; G02F 1/0018; G02F 1/133365; G02F 2001/13775; G02F 2202/00; G02F 2202/02; G02F 2202/021; G02F 2202/022; G02F 2202/023; G02F 2202/025; G02F 2202/20; G02F 2202/30; G02F 2202/34; G02F 2202/36; G02F 2202/42; G02F 1/133707; G02F 1/133784; G02F 1/133711; G02F 1/133703; G02F 2001/133715; G02F 2001/133726; G02F 2001/133796; G02F 1/133734; G09G 2300/0495; G09G 2300/0486; H01L 21/02211; H05K 3/389; C08F 259/08; C09K 2019/548; C09K 19/04; C09K 19/56; C09K 19/38; Y10T 428/10; Y10T 428/1009; Y10T 428/1005; B32B 2457/202; B32B 17/10504; B32B 2305/55
 USPC .................. 349/123–136; 428/1.1, 1.2, 1.21
 See application file for complete search history.

(56) References Cited

U.S. PATENT DOCUMENTS

| | | | |
|---|---|---|---|
| 2003/0164917 A1* | 9/2003 | Ohta | G02F 1/134363 349/141 |
| 2006/0290878 A1* | 12/2006 | Shin | G02F 1/1341 349/190 |
| 2010/0007831 A1* | 1/2010 | Ishida | G02F 1/1337 349/125 |
| 2012/0027160 A1* | 2/2012 | Tobita | G11C 19/184 377/64 |
| 2013/0314627 A1* | 11/2013 | Liu | G02B 27/2242 349/15 |
| 2015/0062478 A1* | 3/2015 | Zhao | G02F 1/1309 349/54 |

\* cited by examiner

DISPLAY PANEL AND METHOD FOR MANUFACTURING THE SAME

CROSS-REFERENCES TO RELATED APPLICATIONS

This application claims the benefit of priority to Chinese Patent Application No. 201410468154.3, filed with the Chinese Patent Office on Sep. 15, 2014 and entitled "DISPLAY PANEL AND METHOD FOR MANUFACTURING THE SAME", the content of which is incorporated herein by reference in its entirety.

TECHNICAL FIELD

The present invention relates to the field of display technologies and particularly to a display panel and a method for manufacturing the same.

BACKGROUND OF THE INVENTION

Liquid crystal displays have been widely applied in numerous fields due to their small volume, light weight, low radiation and other advantages. A liquid crystal display operates by varying voltage applied to liquid crystal molecules and consequentially the rotation angle of the liquid crystal molecules to thereby control the direction, and the state, in which polarized light is rotated, and polarized so as to vary the display state of the liquid crystal display.

There are a display area serving as a display body, and a non-display area serving as an assisting function, in liquid crystal elements. In the display area, the azimuth of the liquid crystal molecules are controlled by a set of electrodes disposed on an array substrate to thereby control the amount of transmitted light from backlight so as to well control together with color filter patterns an image to be displayed, and there are a number of functionally varying combinations of pattern areas in liquid crystal zones in the non-display area, where these patterns are typically composed of differently shaped metal electrodes, and an irregular electric field may be generated when the liquid crystal display is powered on, so that the liquid crystals can not be well controlled, thus making it necessary to place light-shielding patterns in the non-display area.

Consequentially, in addition to the light-shielding patterns, e.g., light-shielding black matrix patterns, typically disposed at corresponding locations on the color filter substrate in the non-display area, iron frames, light-shielding adhesive tapes, etc., may be further disposed above and below the non-display area in order to prevent an influence of slanted light rays exiting a backlight module, and stray light rays scattered in the liquid crystal elements, etc.

However the light-shielding black matrixes, and the upper iron frame, light-shielding adhesive tape, etc., in the non-display area become narrower and narrower as the liquid crystal display is being developed into one with a narrowed frame, so that light may tend to be leaked, thus degrading a display effect, when there is an error in alignment while the liquid crystal display panel is being aligned into the box, the light-shielding adhesive tape is being attached, the iron frame is being assembled, etc.

BRIEF SUMMARY OF THE INVENTION

One inventive aspect is a liquid crystal display panel. The panel includes an array substrate, and an opposite substrate disposed opposite to the array substrate, where each of the array substrate and the opposite substrate include a display area and a non-display area. The panel also includes a liquid crystal layer sandwiched between the array substrate and the opposite substrate, a first alignment layer disposed on a surface of the array substrate facing the liquid crystal layer, and a second alignment layer disposed on a surface of the opposite substrate facing the liquid crystal layer. The first alignment layer and the second alignment layer define a first orientation direction in the display area, and the non-display area includes at least one electrode line. The first alignment layer and the second alignment layer also define a second orientation direction at least in the non-display area corresponding to the electrode line. In addition, the first orientation direction is different from the second orientation direction.

Another inventive aspect is a method for manufacturing a liquid crystal display panel. The method includes preparing an array substrate and an opposite substrate, each including a display area and a non-display area, where the non-display area includes at least one electrode line. The method also includes forming a first alignment material layer on a surface of the array substrate. The method also includes forming a second alignment material layer on a surface of the opposite substrate, performing an orientation process on the first alignment material layer and on the second alignment material layer to form a first alignment layer and a second alignment layer, wherein the first alignment layer and the second alignment layer define a first orientation direction in the display area, and the first alignment layer and the second alignment layer define a second orientation direction different from the first orientation direction at least in the non-display area corresponding to the electrode line. The method also includes arranging the surface of the array substrate on which the first alignment layer is disposed, and the surface of the opposite substrate on which the second alignment layer is disposed, opposite to each other, and aligning the array substrate and the opposite substrate. The method also includes bonding the array substrate and the opposite substrate together, and providing a liquid crystal layer between the array substrate and the opposite substrate.

DETAILED DESCRIPTION OF THE PREFERRED EMBODIMENTS

The invention will be further described below with reference to the drawings and embodiments thereof in order to make the objects, features and advantages of the invention more apparent.

It shall be noted that particular details will be set forth in the following description to facilitate full understanding of the invention. However the invention can be practiced in numerous other implementations than those described here, and those skilled in the art can make generalizations thereto without departing from the spirit of the invention. Accordingly the invention will be limited to the particular embodiments disclosed below.

Figure 1:
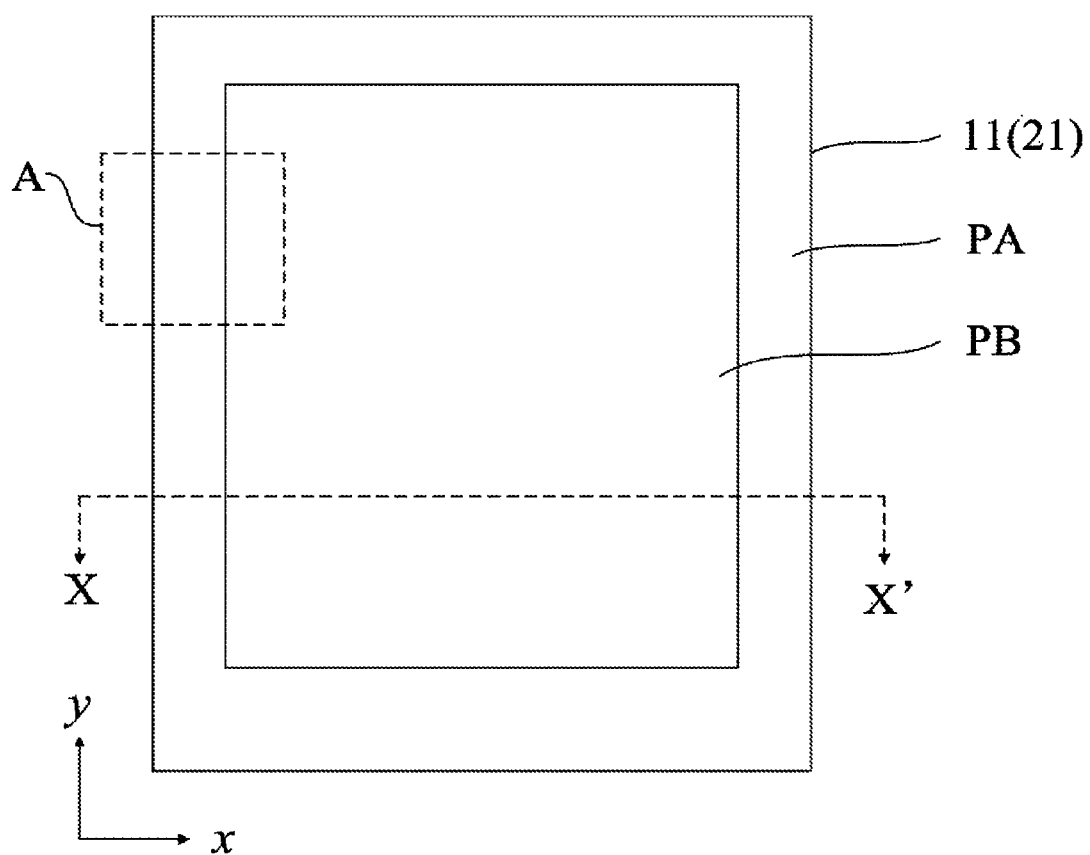
FIG. 1 illustrates a schematic structural diagram of a liquid crystal display panel according to an embodiment of the invention in a top view.
Figure 2:
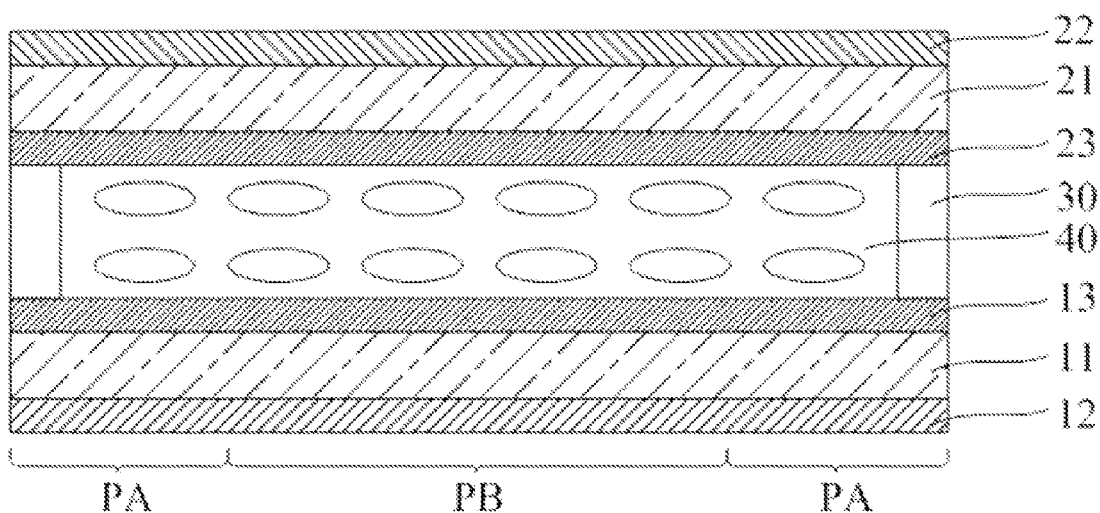
FIG. 2 illustrates a schematic structural diagram of a section in FIG. 1 taken along XX'.
Figure 3:
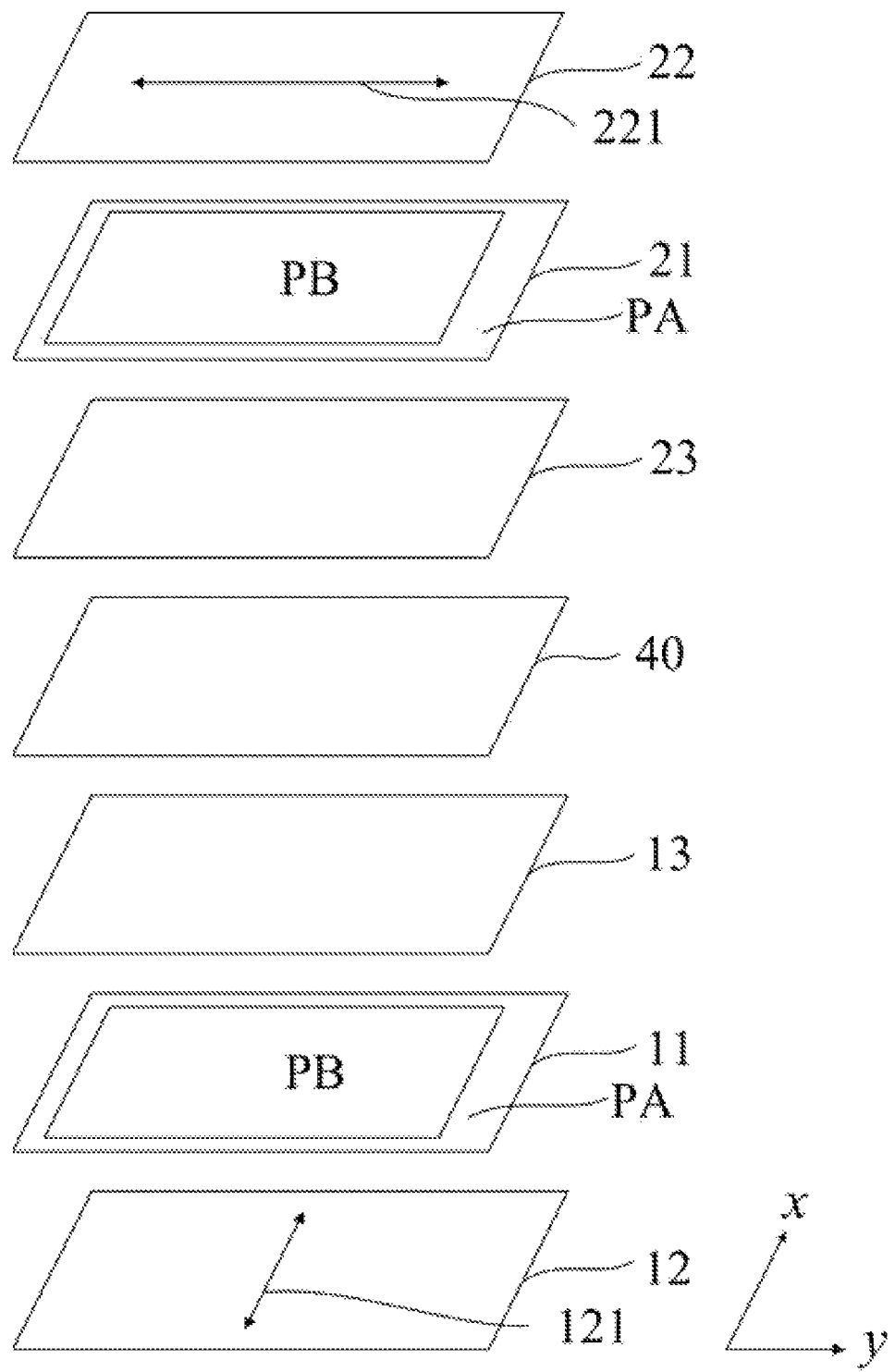
FIG. 3 illustrates a schematic structural diagram of the liquid crystal display panel in FIG. 1 in an exploded view.
Figure 4:
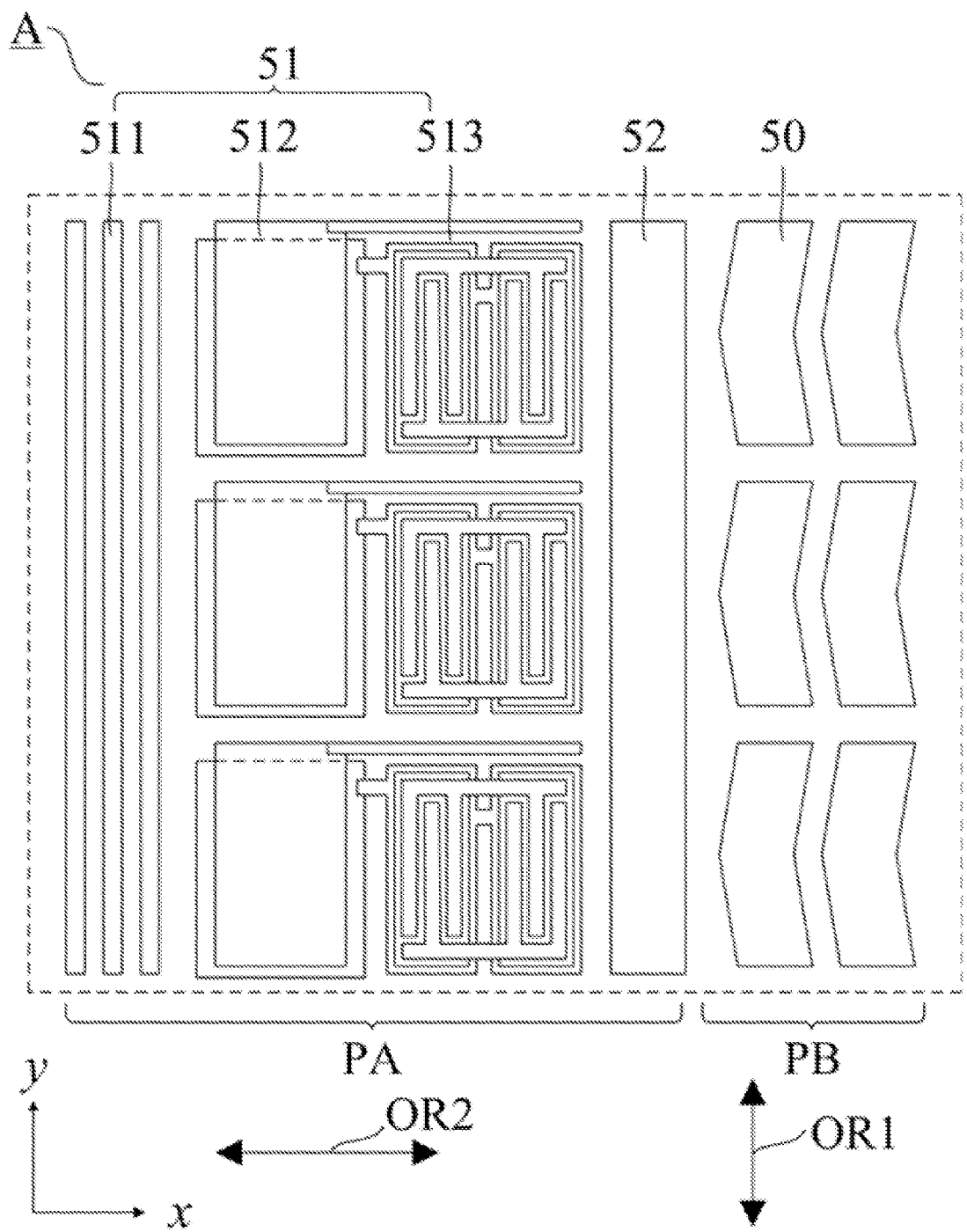
FIG. 4 illustrates a schematic structural diagram of an enlarged area A in FIG. 1.
Figure 5:
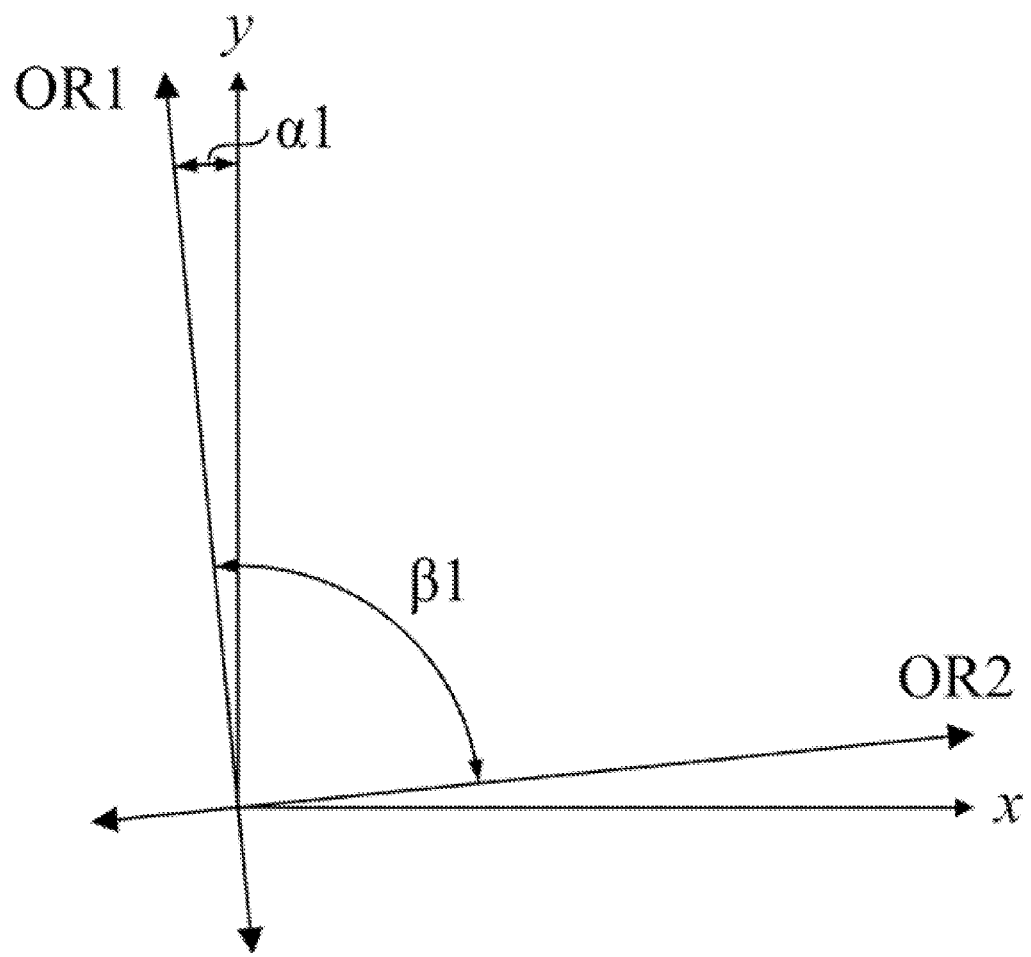
FIG. 5 illustrates a schematic diagram of an angle relationship in FIG. 4.

Referring to FIG. 1 to FIG. 5, FIG. 1 illustrates a schematic structural diagram of a liquid crystal display panel according to an embodiment of the invention in a top view, FIG. 2 illustrates a schematic structural diagram of a section in FIG. 1 taken along XX', FIG. 3 illustrates a schematic structural diagram of the liquid crystal display panel in FIG. 1 in an exploded view, FIG. 4 illustrates a schematic structural diagram of an enlarged area A in FIG. 1, and FIG. 5 illustrates a schematic diagram of an angle relationship in FIG. 4.

Referring to FIG. 1 to FIG. 3, the liquid crystal display panel includes: an array substrate 11, and an opposite substrate 21 disposed opposite to the array substrate 11, both of which include a display area PB and a non-display area PA; a liquid crystal layer 40 sandwiched between the array substrate 11 and the opposite substrate 21; and a first alignment layer 13 disposed on the surface of the array substrate 11 facing the liquid crystal layer 40, and a second alignment layer 23 disposed on the surface of the opposite substrate 21 facing the liquid crystal layer 40.

Particularly further referring to FIG. 1 and FIG. 2, the array substrate 11 and the opposite substrate 21 can be glass substrates, quartz substrates or other inorganic material based substrates or can be substrates made of an organic material. The array substrate 11 and the opposite substrate 21 are embodied as glass substrates in this embodiment.

The first alignment layer 13 made of a material which is at least one of polyamide acid, polyamic acid ester and polyimide is formed on the surface of the array substrate 11. An alignment material layer of the polyamide acid, polyamic acid ester and polyimide materials is typically stable and will not react with vapor, etc., even at 150 to 250° C. Switch elements, pixel electrodes, common electrodes, data lines, scan lines and other elements (not illustrated) are typically formed between the array substrate 11 and the first alignment layer 13.

The second alignment layer 23, which can be made of at least one of polyamide acid, polyamic acid ester and polyimide like the first alignment layer 13, is formed on the surface of the opposite substrate 21. Color-filter and light-shielding black matrixes in a variety of colors are typically formed between the opposite substrate 21 and the second alignment layer 23.

The surface of the array substrate 11, on which the first alignment layer 13 is disposed, is disposed opposite to, and bonded by a frame sealant to, the surface of the opposite substrate 21 on which the second alignment layer 23 is disposed, and the liquid crystal layer 40 is disposed between the first alignment layer 13 on the array substrate 11 and the second alignment layer 23 on the opposite substrate 21.

Further referring to FIG. 1 to FIG. 3, the liquid crystal display panel further includes: a first polarization film 12, with a first transmission axis 121 extending in a first direction x, disposed on the side of the array substrate 11 away from the liquid crystal layer 40; and a second polarization film 22, with a second transmission axis 221 extending in a second direction y perpendicular to the first direction, disposed on the side of the opposite substrate 21 away from the liquid crystal layer 40.

Further referring to FIG. 1 to FIG. 3, both the array substrate 11 and the opposite substrate 21 include the display area PB and the non-display area PA.

More particularly scan lines and data lines (not illustrated) extending in substantially mutually perpendicular directions are formed in the display area PB of the array substrate 11 so that pixel zones are surrounded by adjacent scan lines and data lines, that is, there are a plurality of pixels in the display area PB. Any of the pixels is formed with a first electrode and a second electrode, both of which are typically made of a transparent electrically-conductive material, e.g., Indium Tin Oxide (ITO) or Indium Zinc Oxide (IZO). TFT switch elements are further formed where the scan lines intersect with the data lines, where the TFT switch elements have gates electrically connected with the scan lines, sources electrically connected with the data lines, and drains electrically connected with the first electrodes or the second electrodes; and pixel voltage is applied to the electrodes connected with the drains while the panel is operating. One of the first electrodes and the second electrodes, which are not connected with the drains, are eclectically connected with common electrode lines, and common voltage is applied thereto while the panel is operating. When voltage is applied respectively to the first electrodes and the second electrodes, an electric field is formed between the first electrodes and the second electrodes to drive liquid crystal molecules of the liquid crystal layer 40 to be rotated. Gate driver electrodes, fan-out area metal wires, common electrode lines, electrostatic prevention element electrodes, electrostatic prevention lines and other metal electrode lines are formed in the non-display area PA of the array substrate 11, and these metal electrode lines are connected with respective wires in the display area PB and respective terminals in a chip to control the display panel for operation.

Referring to FIG. 4, the first alignment layer 13 and the second alignment layer 23 define a first orientation direction OR1 in the display area PB. Particularly as illustrated in FIG. 4, there are a plurality of pixels 50 in the display area PB, and in this embodiment, the plurality of pixels 50 are disposed extending in the first direction x and include two components inclined, at different angles relative to the second direction y, symmetric to the first direction x. There is the first orientation direction OR1 of the first alignment layer 13 and the second alignment layer 23 in the display area PB.

Further referring to FIG. 4, the non-display area PA includes at least one electrode line; and the first alignment layer 13 and the second alignment layer 23 define a second orientation direction OR2 different from the first orientation direction OR1 at least in the non-display area corresponding to the electrode line.

Preferably when the liquid crystal layer 40 is a positive liquid crystal layer, the electrode line extends in a direction aligned with the first orientation direction OR1 at an angle $\alpha 1$, satisfying $-1°<\alpha 1<1°$, and the second orientation direction OR2 and the first orientation direction OR1 are aligned at an angle $\beta 1$, satisfies $89°<\beta 1<91°$.

Particularly in this embodiment, the liquid crystal layer 40 is a positive liquid crystal layer, and when an electric field is applied to the liquid crystal layer, liquid crystal molecules in the liquid crystal layer 40 will be deflected in such a direction that major axes of the liquid crystal molecules are parallel to the electric field. In this embodiment, there are a plurality of gate driver signal lines 511, gate driver capacitors 512, gate driver transistors 513 and common electrode buses 52 in the non-display area PA, where the plurality of gate driver signal lines 511, gate driver capacitors 512 and gate driver transistors 513 constitute gate driver electrodes 51 which are the electrode lines in this embodiment, and the gate driver electrodes 51 extend in the second direction y, and there is the second orientation direction OR2 of the first alignment layer 12 and the second alignment layer 22 in the non-display area PA where the gate driver electrodes 51 are located.

More particularly referring to FIG. 5, with the angle $\alpha 1$ between the first orientation direction OR1 and the direction in which the electrode line extends, i.e., the second direction y, when the first orientation direction is counterclockwise from the second direction, the angle $\alpha 1$ is negative, and when the first orientation direction is clockwise from the second direction, the angle $\alpha 1$ is positive, and the angle $\alpha 1$ satisfies $-1°<\alpha 1<1°$, and the angle $\beta 1$ between the second orientation direction OR2 and the first orientation direction OR1 satisfies $89°<\beta 1<91°$.

Preferably there is an optimum display state of the display panel with the angle $\alpha 1$ of substantially 0° and the angle $\beta 1$ of substantially 90°. At this time when the display panel is powered on for display, voltage is applied to the gate drive electrodes 51 for signal transmission, and an electric field will be generated between the gate driver signal lines 511, the gate driver capacitors 512 and the gate driver transistors 513 to be applied to the liquid crystal molecules in the non-display area for rotation thereof. In this embodiment, an electric field substantially perpendicular to the second direction y will be generated between the plurality of gate driver signal lines 511 extending in the second direction y, the sides of the gate driver capacitors 512 in the y direction, and the electrodes of the gate driver transistors 513 extending in the y direction. In this embodiment, the second orientation direction OR2 of the first alignment layer 13 and the second alignment layer 23 in the area where the gate driver electrodes are located is substantially perpendicular to the second direction y, and the major axes of the liquid crystal molecules in the area are disposed perpendicular to the second direction y, and in this embodiment, the positive liquid crystals in use tend to be deflected by the electric field to such a direction that the major axes of the liquid crystal molecules are parallel to the electric field, so the liquid crystals in the area will not be deflected when the display panel is powered on to thereby avoid light from being leaked because the liquid crystals are rotated by an irregular electric field when surrounding electrodes are powered on.

The non-display area of the liquid crystal display panel according to this embodiment includes at least one electrode line, the orientation direction of the alignment layer in the non-display area, where the electrode line is located, is different from the display area and parallel to the direction of the transmission axis of the upper polarization film or the lower polarization film, and with positive liquid crystal molecules, the orientation direction is substantially perpendicular to the electrode line, or with negative liquid crystal molecules, the orientation direction is substantially parallel to the electrode line, so that the liquid crystal molecules in the non-display area where the electrode line is located will not be deflected when the electrode line is powered on to thereby avoid light from being leaked because the liquid crystals are rotated by an irregular electric field when surrounding electrodes are powered on so as to alleviate light leakage in the non-display area, thus improving a display effect. Preferably a defect due to light leakage can be mitigated even when there is an error in alignment of the array substrate to the color filter substrate, thus improving the yield of and lowering the cost of the product.

Figure 6:
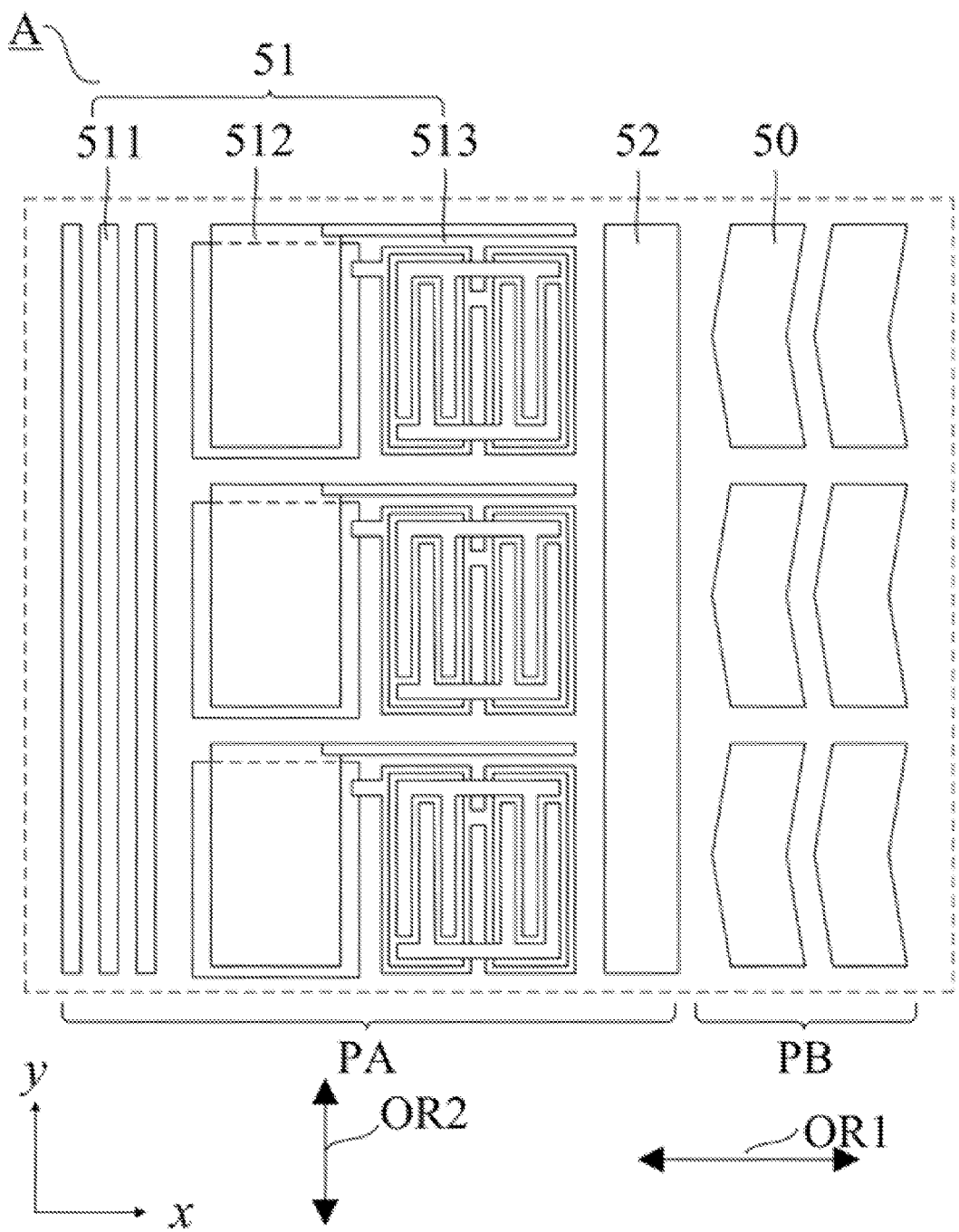
FIG. 6 illustrates another schematic structural diagram of the enlarged area A in FIG. 1.
Figure 7:
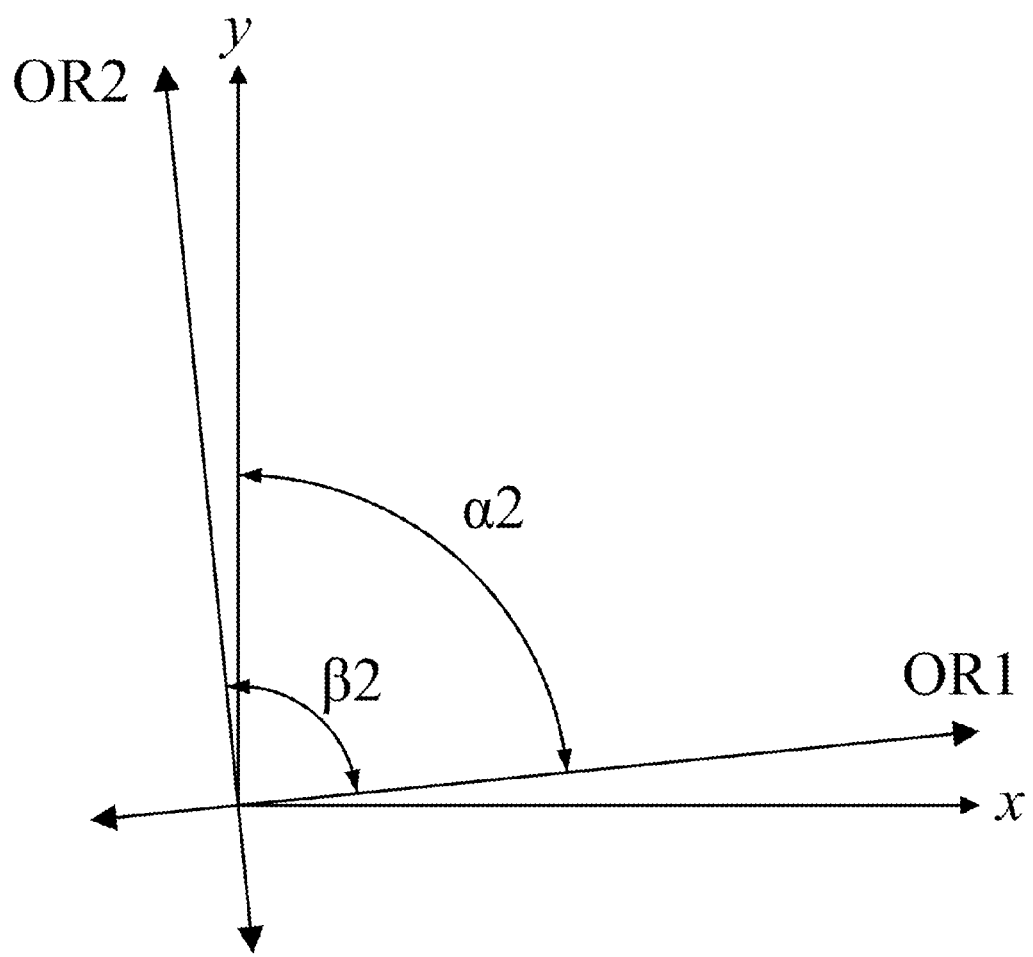
FIG. 7 illustrates a schematic diagram of an angle relationship in FIG. 6.

It shall be noted that this embodiment has been described taking positive liquid crystal molecules as an example, but the liquid crystal layer 40 can alternatively be embodied as negative liquid crystal molecules in some other embodiments, and referring to FIG. 6 and FIG. 7, FIG. 6 illustrates another schematic structural diagram of the enlarged area A in FIG. 1, and FIG. 7 illustrates a schematic diagram of an angle relationship in FIG. 6.

Referring to FIG. 6, the first alignment layer 13 and the second alignment layer 23 define a first orientation direction OR1 in the display area PB. Particularly as illustrated in FIG. 6, there are a plurality of pixels 50 in the display area PB, and in this embodiment, the plurality of pixels 50 are disposed extending in the first direction x and include two components inclined, at different angles relative to the second direction y, symmetric to the first direction x. There is the first orientation direction OR1 of the first alignment layer 13 and the second alignment layer 23 in the display area PB.

Further referring to FIG. 6, the non-display area PA includes at least one electrode line; and the first alignment layer 13 and the second alignment layer 23 define a second orientation direction OR2 different from the first orientation direction OR1 at least in the non-display area corresponding to the electrode line.

Preferably when the liquid crystal layer 40 is a negative liquid crystal layer, the electrode line extends in a direction aligned with the first orientation direction OR1 at an angle $\alpha 2$, satisfying $89°<\alpha 2<91°$, and the second orientation direction OR2 and the first orientation direction OR1 are aligned at an angle $\beta 2$, satisfying $89°<\beta 2<91°$.

Particularly in this embodiment, the liquid crystal layer 40 is a negative liquid crystal layer, and when an electric field is applied to the liquid crystal layer, liquid crystal molecules in the liquid crystal layer 40 will be deflected in such a direction that major axes of the liquid crystal molecules are perpendicular to the electric field. In this embodiment, there are a plurality of gate driver signal lines 511, gate driver capacitors 512, gate driver transistors 513 and common electrode buses 52 in the non-display area PA, where the plurality of gate driver signal lines 511, gate driver capacitors 512 and gate driver transistors 513 constitute gate driver electrodes 51 which are the electrode lines in this embodiment, and the gate driver electrodes 51 extend in the second direction y, and the first alignment layer 12 and the second alignment layer 22 define the second orientation direction OR2 in the non-display area PA where the gate driver electrodes are located.

More particularly referring to FIG. 7, with the angle $\alpha 2$ between the first orientation direction OR1 and the direction in which the electrode line extends, i.e., the second direction y, the angle $\alpha 2$ satisfies $89°<\alpha 2<91°$, and the angle $\beta 2$ between the second orientation direction OR2 and the first orientation direction OR1 satisfies $89°<\beta 2<91°$.

Preferably there is an optimum display state of the display panel with the angle $\alpha 2$ of substantially 90° and the angle $\beta 2$ of substantially 90°.

Moreover this embodiment has been described taking the gate driver electrodes as an example, but the electrode lines can be one or more of data lines, scan lines and other metal wires or of common electrodes, electrostatic prevention element electrodes and electrostatic prevention lines in a real implementation. Due to a number of structures of the display panel, accordingly there may be also a number of structures of the non-display area PA, and the particular structure of the non-display area PA has not been defined in this embodiment, so this embodiment will not be limited in structure to FIG. 4 or FIG. 6. Moreover for the sake of clarifying the essence of this embodiment, less relevant structures on the array substrate have been omitted in FIG. 4 and FIG. 6, and this embodiment will not be limited thereto.

Figure 8:
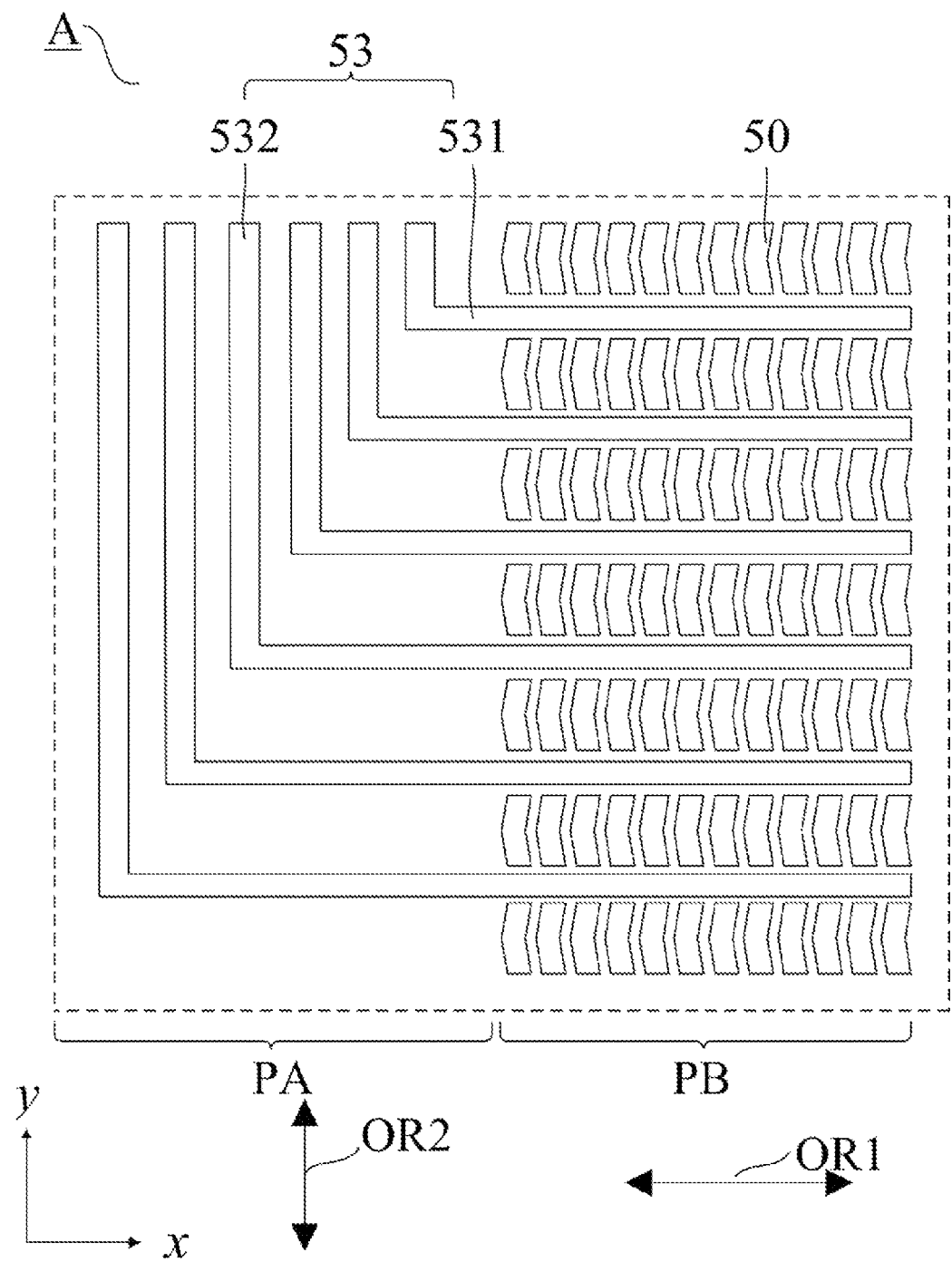
FIG. 8 illustrates still another schematic structural diagram of the enlarged area A in FIG. 1.

Referring to FIG. 8, there is illustrated still another schematic structural diagram of the enlarged area A in FIG. 1, where the first alignment layer 13 and the second alignment layer 23 define a first orientation direction OR1 in the display area PB. Particularly as illustrated in FIG. 8, there are a plurality of pixels 50 in the display area PB, and in this embodiment, the plurality of pixels 50 are disposed extending in the first direction x and include two components inclined, at different angles relative to the second direction y, symmetric to the first direction x. The first alignment layer 13 and the second alignment layer 23 define the first orientation direction OR1 in the display area PB.

Further referring to FIG. 8, the non-display area PA includes at least one electrode line; and the first alignment layer 13 and the second alignment layer 23 define a second orientation direction OR2 different from the first orientation direction OR1 at least in the non-display area corresponding to the electrode line.

Preferably when the liquid crystal layer 40 is a positive liquid crystal layer, the electrode line extends in a direction aligned with the first orientation direction OR1 at an angle α1, satisfying $-1°<α1<1°$, and the second orientation direction OR2 and the first orientation direction OR1 are aligned at an angle β1, satisfies $89°<β1<91°$.

Particularly in this embodiment, the liquid crystal layer 40 is a positive liquid crystal layer, and when an electric field is applied to the liquid crystal layer, liquid crystal molecules in the liquid crystal layer 40 will be deflected in such a direction that major axes of the liquid crystal molecules are parallel to the electric field. In this embodiment, there are a plurality of data lines 53 in the non-display area PA, including first data lines 531 extending in the first direction x and second data lines 532 extending the second direction y, where the second data lines 532 are the electrode lines, and there is the second orientation direction OR2 of the first alignment layer 12 and the second alignment layer 22 in the non-display area PA where the gate driver electrodes are located.

More particularly with the same angle relationship as in FIG. 5, referring to FIG. 5, with the angle α1 between the first orientation direction OR1 and the direction in which the electrode line extends, i.e., the second direction y, when the first orientation direction OR1 is counterclockwise from the second direction y, the angle α1 is negative, and when the first orientation direction OR is clockwise from the second direction y, the angle α1 is positive, and the angle α1 satisfies $-1°<α1<1°$, and the angle β1 between the second orientation direction OR2 and the first orientation direction OR1 satisfies $89°<β1<91°$.

Preferably there is an optimum display state of the display panel with the angle α1 of substantially 0° and the angle β1 of substantially 90°. At this time when the display panel is powered on for display, voltage is applied to the data lines 53 for signal transmission, and an electric field will be generated between the plurality of second data lines 532 to be applied to the liquid crystal molecules in the non-display area for rotation thereof. In this embodiment, an electric field extending substantially perpendicular to the plurality of second data lines 532 will be generated between the second data lines 532. In this embodiment, the second orientation direction OR2 of the first alignment layer 13 and the second alignment layer 23 in the area where the second data lines 532 are located is substantially perpendicular to the direction in which the second data lines 532 extend, and the major axes of the liquid crystal molecules in the area are disposed perpendicular to the direction in which the second data lines 532 extend, and in this embodiment, the positive liquid crystals in use tend to be deflected by the electric field to such a direction that the major axes of the liquid crystal molecules are parallel to the electric field, so the liquid crystals in the area will not be deflected when the display panel is powered on to thereby avoid light from being leaked because the liquid crystals are rotated by an irregular electric field when surrounding electrodes are powered on.

Similarly in this embodiment, the liquid crystal layer 40 can alternatively be embodied as negative liquid crystal molecules and when the liquid crystal layer 40 is embodied as negative liquid crystal molecules, preferably the electrode line, i.e., the second data line 532, extends in a direction aligned with the first orientation direction OR1 at an angle α2, satisfying $89°<α2<91°$, and the second orientation direction OR2 and the first orientation direction OR1 are aligned at an angle β2, satisfying $-89°<β2<91°$. More particularly referring to FIG. 7, with the angle α2 between the first orientation direction OR1 and the direction in which the electrode line, i.e., the second data line 562, extends, i.e., the second direction y, the angle α2 satisfies $89°<α2<91°$, and the angle β2 between the second orientation direction OR2 and the first orientation direction OR1 satisfies $89°<β2<91°$. Preferably there is an optimum display state of the display panel with the angle α2 of substantially 90° and the angle β2 of substantially 90°.

Moreover this embodiment has been described taking the second data lines 532 as an example, but the electrode lines can be one or more of data lines, scan lines and other metal wires or of common electrodes, electrostatic prevention element electrodes and electrostatic prevention lines in a real implementation. Due to a number of structures of the display panel, accordingly there may be also a number of structures of the non-display area PA, and the particular structure of the non-display area PA has not been defined in this embodiment, so this embodiment will not be limited in structure to FIG. 8. Moreover for the sake of clarifying the essence of this embodiment, less relevant structures on the array substrate 11 have been omitted in FIG. 8, and this embodiment will not be limited thereto.

The non-display area of the liquid crystal display panel according to this embodiment includes at least one electrode line, the orientation direction of the alignment layer in the non-display area, where the electrode line is located, is different from the display area and parallel to the direction of the transmission axis of the upper polarization film or the lower polarization film, and with positive liquid crystals, the orientation direction is substantially perpendicular to the electrode line, or with negative liquid crystals, the orientation direction is substantially parallel to the electrode line, so that the liquid crystal molecules in the non-display area where the electrode line is located will not be deflected when the electrode line is powered on to thereby avoid light from being leaked because the liquid crystals are rotated by an irregular electric field when surrounding electrodes are powered on so as to alleviate light leakage in the non-display area, thus improving a display effect. Preferably a defect due to light leakage can be mitigated even when there is an error in alignment of the array substrate to the color filter substrate, thus improving the yield of and lowering the cost of the product.

Figure 9:
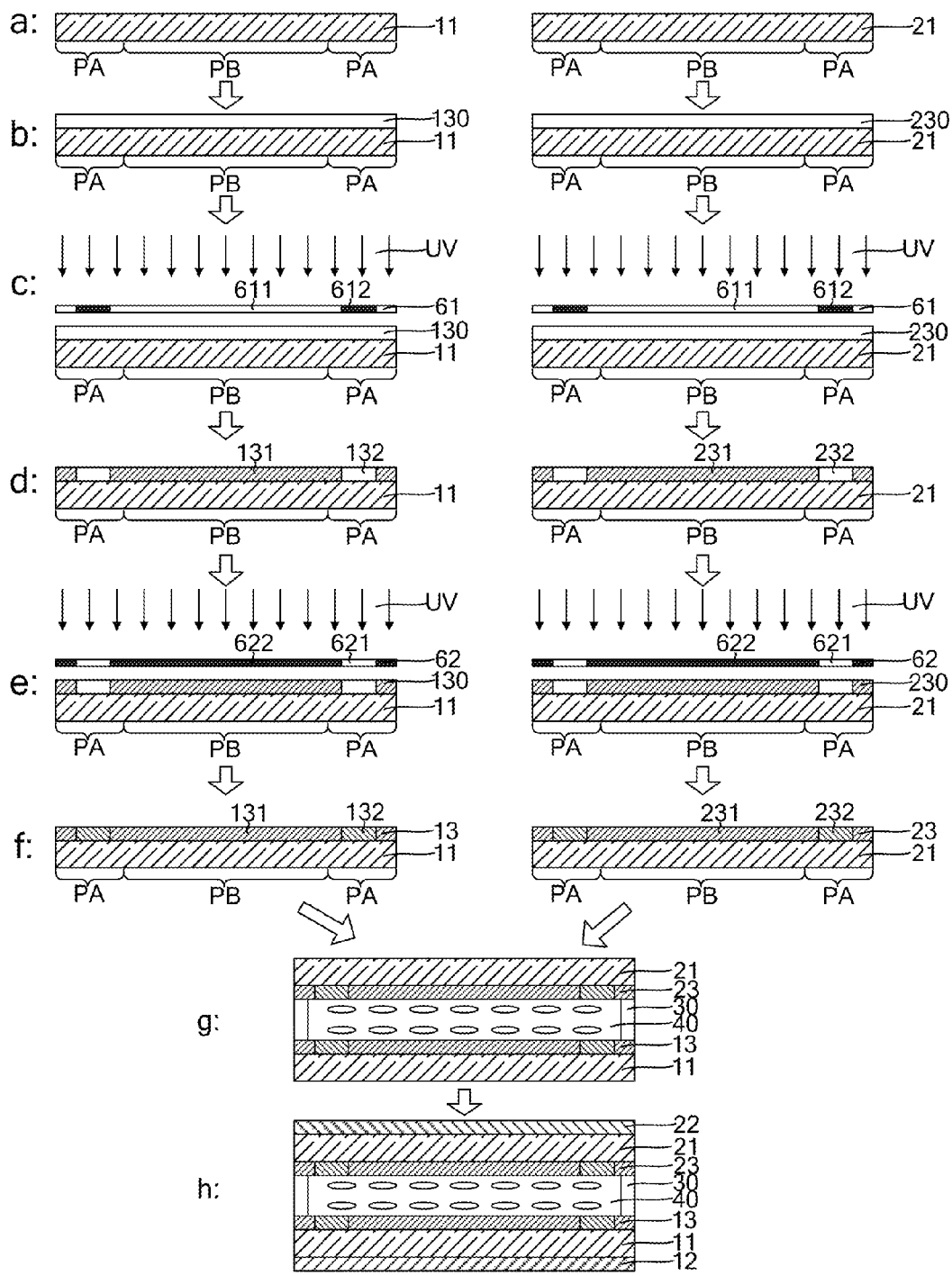
FIG. 9 illustrates a schematic flow chart of manufacturing a liquid crystal display panel according to an embodiment of the invention.

Referring to FIG. 9, there is illustrated a schematic flow chart of manufacturing a liquid crystal display panel according to an embodiment of the invention, where the liquid crystal display panel includes: an array substrate, and an opposite substrate disposed opposite to the array substrate, both of which include a display area and a non-display area; a liquid crystal layer sandwiched between the array substrate and the opposite substrate; a first alignment layer disposed on the surface of the array substrate facing the liquid crystal layer, and a second alignment layer disposed on the surface of the opposite substrate facing the liquid crystal layer; the first alignment layer and the second alignment layer define a first orientation direction in the display area; the non-display area includes at least one electrode line; the first alignment layer and the second alignment layer define a second orientation direction at least in the non-display area corresponding to the electrode line; and the first orientation is different from the second orientation direction.

Referring to FIG. 9, a step S1 is performed to prepare an array substrate and an opposite substrate, each including a display area and a non-display area, wherein the non-display area includes at least one electrode line.

As shown in the process a, the array substrate 11 and the opposite substrate 21 are prepared, where the array substrate 11 and the opposite substrate 21 can be glass substrates, quartz substrates or other inorganic material based substrates or can be substrates made of an organic material. The array substrate 11 and the opposite substrate 21 are embodied as glass substrates in this embodiment. The array substrate 11 and the opposite substrate 21 include the display area PB and the non-display area PA. Switch elements, pixel electrodes, common electrodes, data lines, scan lines and other elements (not illustrated) are typically formed on the surface of the array substrate 11 in the display area PB, and the non-display area PA of the array substrate includes at least one electrode line (not illustrated), which can be one or more of a gate driver electrode, a metal wire, a common electrode, an electrostatic prevention element electrode and an electrostatic prevention line. Color-filter and light-shielding black matrixes in a variety of colors are typically formed on the surface of the opposite substrate 21.

Referring to FIG. 9, a step S2 is performed to form a first alignment material layer on the surface of the array substrate and a second alignment material layer on the surface of the opposite substrate.

As shown in the process b, before the first alignment material layer 130 is formed on the surface of the array substrate 11 and the second alignment material layer 230 is formed on the surface of the opposite substrate 21, the array substrate 11 and the opposite substrate 21 can be cleaned to remove contaminant particles potentially present on the substrates, and then the substrates can be baked.

The material of the alignment material layers is at least one of polyamide acid, polyamic acid ester and polyimide. An alignment material layer of the polyamide acid, polyamic acid ester and polyimide materials is typically stable and will not react with vapor, etc., even at 150 to 250° C.

The alignment material layers can be formed by coating orientation liquid on the substrates through spin-coating, slit-coating or otherwise, where polyimide is a primary component of the orientation liquid, and a thin polyimide film has excellent robustness to high and low temperature, electrical insulation, adhesion, robustness to radiation, robustness to a medium, etc., can be in durable use at temperature ranging from −269 to 280° C. and can reach high temperature of 400° C. very soon, and a solvent component of the orientation liquid can include N-methyl-2-pyrrolodone (NMP), butycellosolve (BC) or γ-butyrolactone (BL), NMP is used to resolve polyimide, BC to improve printability and BL to assist in resolving polyimide.

Further referring to FIG. 9, a step S3 is performed to perform an orientation process on the first alignment material layer 130 and the second alignment material layer 230 to form a first alignment layer 13 and a second alignment layer 23, wherein the first alignment layer 13 and the second alignment layer 23 define a first orientation direction in the display area PB, and define a second orientation direction different from the first orientation direction at least in the non-display area corresponding to the electrode line. Preferably when the liquid crystal layer is a positive liquid crystal layer, the electrode line extends in a direction aligned with the first orientation direction at an angle $\alpha 1$, satisfying $-1°<\alpha 1<1°$, and the second orientation direction and the first orientation direction are aligned at an angle $\beta 1$, satisfying $89°<\beta 1<91°$; and when the liquid crystal layer is a negative liquid crystal layer, the electrode line extends in a direction at an angle $\alpha 2$, satisfying $89°<\alpha 2<91°$, to the first orientation direction, and there is the second orientation direction of the first alignment layer and the second alignment layer in the non-display area where the electrode line is located, where the angle $\beta 2$ between the second orientation direction and the first orientation direction satisfies $89°<\beta 2<91°$.

Particularly as shown in the processes c to f, the orientation process is performed on the first alignment material layer 130 and the second alignment material layer 230 through photo alignment process.

Before the orientation process is performed, the first alignment material layer 130 and the second alignment material layer 230 can be pre-baked at temperature ranging from 100 to 150° C. for a period of time ranging from 15 to 30 minutes to thereby substantially remove a solvent.

After being pre-baked, as shown in the processes c and d, a first mask 61 is prepared with a first light-transmitting area 611 and a first light-shielding area 612, the first light-shielding area 612 corresponds to the non-display area where the electrode line is located, and the first alignment material layer 130 and the second alignment material layer 230 are illuminated using UV polarized light through the first mask 61 so that there is the first orientation direction of the first alignment material layer 130 and the second alignment material layer 230 in other areas 131 and 231 than the non-display areas 132 and 232 where the electrode lines are located.

Then as shown in the processes e and f, a second mask 62 is prepared with a second light-transmitting area 621 and a second light-shielding area 622, the second light-transmitting area 621 corresponds to the non-display areas 132 and 232 where the electrode lines are located, and the first alignment material layer 130 and the second alignment material layer 230 are illuminated using UV polarized light through the second mask 62 so that there is the second orientation direction of the first alignment material layer 130 and the second alignment material layer 230 in the non-display areas 132 and 232 where the electrode lines are located.

Thereafter the first alignment material layer 130 and the second alignment material layer 230 are post-baked to form the first alignment layer 13 and the second alignment layer 23. They can be post-baked at constant temperature or at temperature dropping in a segmented manner to thereby facilitate orientation and stabilization of the alignment layers. When they are baked at constant temperature, they can be post-baked at temperature ranging from 150 to 250° C. for a period of time ranging from 30 to 90 minutes. When they are baked at temperature dropping in a segmented manner, they can be baked at temperature dropping in three, four or five segments.

This embodiment has been described by way of an example where firstly the orientation process is performed using illumination by polarized light and then the substrates are post-baked, but the orientation process using illumination by polarized light and the post-baking can be performed concurrently in some other embodiments of the invention, particularly in the following steps:

The first alignment material layer 130 and the second alignment material layer 230 are pre-baked in the same pre-baking process as described above, so a repeated description thereof will be omitted here.

A first mask 61 is prepared with a first light-transmitting area 611 and a first light-shielding area 612, the first light-shielding area 612 corresponds to the non-display area 132 where the electrode line is located, and the first alignment material layer 130 and the second alignment material layer 230 are illuminated using UV polarized light through the first mask 61 so that there is the first orientation direction of the first alignment material layer 130 and the second alignment material layer 230 in other areas than the non-display areas 132 and 232 where the electrode lines are located, and also the first alignment material layer 130 and the second alignment material layer 230 are post-baked.

A second mask 62 is prepared with a second light-transmitting area 621 and a second light-shielding area 622, the second light-transmitting area 621 corresponds to the non-display areas 132 and 232 where the electrode lines are located, and the first alignment material layer 130 and the second alignment material layer 230 are illuminated using UV polarized light through the second mask 62 so that there is the second orientation direction of the first alignment material layer 130 and the second alignment material layer 230 in the non-display areas 132 and 232 where the electrode lines are located, and also the first alignment material layer 130 and the second alignment material layer 230 are post-baked.

After the steps above are performed, the first alignment material layer 130 and the second alignment material layer 230 can be further illuminated using at least one of infrared rays, remote infrared rays, an electronic beam, and radioactive rays to form the first alignment layer 13 and the second alignment layer 23.

Further referring to FIG. 9, a step S4 is performed to arrange the surface of the array substrate 11 on which the first alignment layer 13 is disposed, and the surface of the opposite substrate 21 on which the second alignment layer 23 is disposed, opposite to each other and to align and bond the substrates together, and to provide a liquid crystal layer 40 between the array substrate 11 and the opposite substrate 21.

Particularly as shown in the process g, the surface of the array substrate 11 on which the first alignment layer 13 is disposed, and the surface of the opposite substrate 21 on which the second alignment layer 23 is disposed, are disposed opposite to each other and aligned and bonded together using a frame sealant 30, and the liquid crystal layer 40 is disposed between the first alignment layer 13 on the array substrate 11 and the second alignment layer 23 on the opposite substrate 21.

Further referring to FIG. 9, after the array substrate 11 and the opposite substrate 21 are aligned and bonded together, a step S5 is further performed to attach a first polarization film 12 with a first transmission axis extending in a first direction on the side of the array substrate 11 away from the liquid crystal layer; and to attach a second polarization film 22 with a second transmission axis extending in a second direction on the side of the opposite substrate 21 away from the liquid crystal layer, where the first direction is perpendicular to the second direction, and the first orientation direction is parallel to the first direction or to the second direction.

It shall be noted that this embodiment has been described by way of an example where the orientation process is performed on the first alignment material layer 130 and the second alignment material layer 230, but the orientation process can alternatively be performed through orientation using an ion beam in some other embodiments of the invention. The orientation process can be performed using an ion beam by moving the substrate with the alignment material layer into a vacuum cavity chamber, generating ions from an ion gun and further filling the ions into a linear ion beam to scan and impact the alignment material layer in different zones to thereby perform the orientation process. Particularly a specific section of a primary chain of the alignment material of the alignment material layer is broken by the ion beam to orient the liquid crystal molecules in a predetermined direction, whereas a side chain thereof is configured to form a pre-inclination angle.

The non-display area of the liquid crystal display panel prepared according to this embodiment includes at least one electrode line, the orientation direction of the alignment layer in the non-display area, where the electrode line is located, is different from the display area and parallel to the direction of the transmission axis of the upper polarization film or the lower polarization film, and with positive liquid crystals, the orientation direction is substantially perpendicular to the electrode line, or with negative liquid crystals, the orientation direction is substantially parallel to the electrode line, so that the liquid crystal molecules in the non-display area where the electrode line is located will not be deflected when the electrode line is powered on to thereby avoid light from being leaked because the liquid crystals are rotated by an irregular electric field when surrounding electrodes are powered on so as to alleviate light leakage in the non-display area, thus improving a display effect. Preferably a defect due to light leakage can be mitigated even when there is an error in alignment of the array substrate to the color filter substrate, thus improving the yield of and lowering the cost of the product.

The foregoing disclosure has described the invention in further details in connection with the particular preferred embodiments thereof but shall not be construed as limiting the invention thereto. Those ordinarily skilled in the art can further make several apparent derivations or substitutions thereto without departing from the scope of the invention, and all these derivations or substitutions shall be deemed as falling into the scope of the invention as claimed.

What is claimed is:

1. A liquid crystal display panel, comprising:
   an array substrate;
   an opposite substrate disposed opposite to the array substrate, wherein the array substrate and the opposite substrate both comprise a display area and a non-display area;
   a plurality of gate driver electrodes comprising a plurality of gate driver signal lines, gate driver capacitors and gate driver transistors formed in the non-display area of the array substrate;
   a liquid crystal layer sandwiched between the array substrate and the opposite substrate;
   a first alignment layer disposed on a surface of the array substrate facing the liquid crystal layer; and a second alignment layer disposed on a surface of the opposite substrate facing the liquid crystal layer, wherein portions of the first alignment layer and the second alignment layer define only a first orientation direction in the display area;

wherein at least one electrode line is disposed in the non-display area;

wherein portions of the first alignment layer and the second alignment layer overlapping the plurality of gate driver signal lines, the gate driver capacitors and the gate driver transistors in the non-display area define only a second orientation direction; wherein the electrode line is oriented in the second orientation direction;

wherein the first orientation direction is different from the second orientation direction; wherein a plurality of data lines are formed in the display area of the array substrate; and wherein the first and second alignment layers initially align liquid crystal molecules in a horizontal direction crossing a vertical cell gap in both the display area and the non-display area.

2. The liquid crystal display panel according to claim 1, wherein:

the liquid crystal layer is a positive liquid crystal layer, the electrode line extends in a direction aligned at an angle $\alpha 1$ with the first orientation direction, $-1°<\alpha 1<1°$, wherein the second orientation direction and the first orientation direction are aligned at an angle $\beta 1$, $89°<\beta 1<91°$.

3. The liquid crystal display panel according to claim 2, wherein the liquid crystal layer is a positive liquid crystal layer, the angle $\alpha 1$ is substantially $0°$, and the angle $\beta 1$ is substantially $90°$.

4. The liquid crystal display panel according to claim 1, further comprising:

a first polarization film, having a first transmission axis extending in a first direction, and being disposed on a surface of the array substrate facing away from the liquid crystal layer; and a second polarization film, having a second transmission axis extending in a second direction perpendicular to the first direction, and being disposed on a surface of the opposite substrate facing away from the liquid crystal layer, wherein the first orientation direction is parallel to either the first direction or the second direction.

5. The liquid crystal display panel according to claim 1, wherein the electrode line is one or more of a gate driver electrode, a metal wire, a common electrode, an electrostatic prevention element electrode, and an electrostatic prevention line.

6. The liquid crystal display panel according to claim 1, further comprising a plurality of pixels in the display area of the array substrate wherein each of the plurality of pixels comprises a first electrode and a second electrode, forming an electric field to rotate liquid crystal molecules in the liquid crystal layer.

7. A method for manufacturing the liquid crystal display panel according to claim 1, comprising:

preparing an array substrate and an opposite substrate, each comprising a display area and a non-display area, wherein the non-display area comprises at least one electrode line;

forming a first alignment material layer on a surface of the array substrate;

forming a second alignment material layer on a surface of the opposite substrate;

performing an orientation process on the first alignment material layer and on the second alignment material layer to form a first alignment layer and a second alignment layer, for both of which there are a first orientation direction in the display area, and a second orientation direction different from the first orientation direction at least in the non-display area corresponding to the electrode line;

arranging the surface of the array substrate on which the first alignment layer is disposed, and the surface of the opposite substrate on which the second alignment layer is disposed, opposite to each other;

aligning the array substrate and the opposite substrate;

bonding the array substrate and the opposite substrate together; and providing a liquid crystal layer between the array substrate and the opposite substrate.

8. The method for manufacturing a liquid crystal display panel according to claim 7, further comprising:

attaching a first polarization film with a first transmission axis extending in a first direction on a side of the array substrate away from the liquid crystal layer; and attaching a second polarization film with a second transmission axis extending in a second direction on a side of the opposite substrate away from the liquid crystal layer, wherein:

the first direction is perpendicular to the second direction, and the first orientation direction is parallel to the first direction or to the second direction.

9. The method for manufacturing a liquid crystal display panel according to claim 7, wherein the orientation process is performed on the first alignment material layer and the second alignment material layer through a photo alignment process.

10. The method for manufacturing a liquid crystal display panel according to claim 9, wherein the photo alignment process comprises:

pre-baking the first alignment material layer and the second alignment material layer;

preparing a first mask with a first light-transmitting area and a first light-shielding area corresponding to the non-display area where the electrode line is located:

illuminating the first alignment material layer and the second alignment material layer using UV polarized light through the first mask in an area other than the non-display area where the electrode line is located;

preparing a second mask with a second light-transmitting area, and a second light-shielding area corresponding to the non-display area where the electrode line is located;

illuminating the first alignment material layer and the second alignment material layer using UV polarized light through the second mask in the non-display area where the electrode line is located; and post-baking the first alignment material layer and the second alignment material layer to form the first orientated layer and the second orientated layer.

11. The method for manufacturing a liquid crystal display panel according to claim 9, wherein the photo alignment process comprises:

pre-baking the first alignment material layer and the second alignment material layer;

preparing a first mask with a first light-transmitting area and a first light-shielding area corresponding to the non-display area where the electrode line is located;

illuminating the first alignment material layer and the second alignment material layer using UV polarized light through the first mask in an area other than the non-display area where the electrode line is located;

post-baking the first alignment material layer and the second alignment material layer;

preparing a second mask prepared with a second light-transmitting area and a second light-shielding area corresponding to the non-display area where the electrode line is located;

illuminating the first alignment material layer and the second alignment material layer using UV polarized light through the second mask in the non-display area where the electrode line is located; and post-baking the first alignment material layer and the second alignment material layer.

12. The method for manufacturing a liquid crystal display panel according to claim 11, wherein after illuminating the first alignment material layer and the second alignment material layer using UV polarized light through the first mask and the second mask, and after post-baking the first alignment material layer and the second alignment material layer, the method further comprises: illuminating the first alignment material layer and the second alignment material layer using at least one of infrared rays, remote infrared rays, an electronic beam, and radioactive rays to form the first alignment layer and the second alignment layer.

13. The liquid crystal display panel according to claim 1, wherein:
the liquid crystal layer is a negative liquid crystal layer, the electrode line extends in a direction aligned at an angle $\alpha 2$ with the first orientation direction, wherein $89°<\alpha 2<91°$, wherein the second orientation direction and the first orientation direction are aligned at an angle $\beta 2$, satisfying $89°<\beta 2<91°$.

14. The liquid crystal display panel according to claim 13, wherein the liquid crystal layer is a negative liquid crystal layer, the angle $\alpha 2$ is substantially 90°, and the angle $\alpha 2$ is substantially 90°.

* * * * *